United States Patent
Eiselt et al.

(10) Patent No.: US 8,326,158 B2
(45) Date of Patent: Dec. 4, 2012

(54) DEVICE AND METHOD FOR TRANSMITTING OPTICAL DATA SIGNALS

(75) Inventors: Michael Eiselt, Kirchheim (DE); Brian Teipen, Kirchheim (DE)

(73) Assignee: ADVA AG Optical Networking, Martinsried/Munich (DE)

( * ) Notice: Subject to any disclaimer, the term of this patent is extended or adjusted under 35 U.S.C. 154(b) by 657 days.

(21) Appl. No.: 12/384,465

(22) Filed: Apr. 3, 2009

(65) Prior Publication Data
US 2009/0252501 A1  Oct. 8, 2009

(30) Foreign Application Priority Data
Apr. 4, 2008 (DE) .................. 10 2008 017 644

(51) Int. Cl.
*H04B 10/04* (2006.01)
(52) U.S. Cl. ........ 398/185; 398/183; 398/186; 398/188; 398/198
(58) Field of Classification Search .................. 398/188, 398/186, 185, 183, 198; 359/276, 279, 284, 359/286, 289
See application file for complete search history.

(56) References Cited

U.S. PATENT DOCUMENTS

| | | | | |
|---|---|---|---|---|
| 5,463,620 A * | 10/1995 | Sriram | ........................ | 370/412 |
| 5,481,542 A * | 1/1996 | Logston et al. | ................ | 725/131 |
| 6,744,992 B2 * | 6/2004 | Bergano | ........................ | 398/183 |
| 7,019,882 B1 | 3/2006 | Wilson | | |
| 7,804,761 B2 * | 9/2010 | Rosenhouse et al. | .......... | 370/204 |
| 2002/0159121 A1 * | 10/2002 | Spickermann | ................ | 359/188 |
| 2003/0198478 A1 * | 10/2003 | Vrazel et al. | ................. | 398/183 |
| 2005/0002676 A1 * | 1/2005 | Zitelli | ............................ | 398/188 |
| 2005/0069329 A1 * | 3/2005 | Giles et al. | .................... | 398/188 |
| 2008/0031630 A1 | 2/2008 | Ohira et al. | | |

FOREIGN PATENT DOCUMENTS

JP  11136206 A  5/1999
WO  WO 03/092237  11/2003

OTHER PUBLICATIONS

German Office Action from DE 10 2008 017 644.3 dated Nov. 21, 2008.
Extended European search report for European Application No. EP 09 15 7267 dated Aug. 11, 2009.

* cited by examiner

*Primary Examiner* — M. R. Sedighian
(74) *Attorney, Agent, or Firm* — Jenkins, Wilson, Taylor & Hunt, P.A.

(57) ABSTRACT

Disclosed are a device and a method for transmitting an optical data signal over an optical transmission channel, comprising a differential phase shift keying unit for differential phase shift keying of at least one serial data stream to generate a differential phase shift keying coded data stream; an amplitude shift keying unit for amplitude coding of at least two further serial data streams that can be selectively activated to generate an amplitude shift keying coded data stream; and a modulation unit for generating an optical data signal in accordance with a control signal that is, formed from the generated differential phase shift keying coded data stream and from the generated amplitude shift keying coded data stream.

16 Claims, 14 Drawing Sheets

| Data (ds3/ds4/ds5) | Symb. 1 | Symb. 2 |
|---|---|---|
| 000 | 1 | 2 |
| 001 | 1 | 3 |
| 010 | 2 | 1 |
| 011 | 3 | 1 |
| 100 | 2 | 2 |
| 101 | 2 | 3 |
| 110 | 3 | 3 |
| 111 | 3 | 2 |

Fig. 6

| Data (ds3/ds4/ds5) | abit1 | abit2 | abit3 | abit4 |
|---|---|---|---|---|
| 000 | 0 | 0 | 1 | 0 |
| 001 | 0 | 0 | 0 | 1 |
| 010 | 1 | 0 | 0 | 0 |
| 011 | 0 | 1 | 0 | 0 |
| 100 | 1 | 0 | 1 | 0 |
| 101 | 1 | 0 | 0 | 1 |
| 110 | 0 | 1 | 0 | 1 |
| 111 | 0 | 1 | 1 | 0 |

Fig. 7

| symbol 1 | | symbol 2 | | output data streams | | |
|---|---|---|---|---|---|---|
| A1 | A2 | A1 | A2 | de3 | de4 | de5 |
| 0 | 0 | 0 | 0 | 0 | 0 | 0 |
| 0 | 0 | 0 | 1 | 0 | 0 | 0 |
| 0 | 0 | 1 | 0 | 0 | 0 | 0 |
| 0 | 0 | 1 | 1 | 0 | 0 | 1 |
| 0 | 1 | 0 | 0 | 0 | 1 | 0 |
| 0 | 1 | 0 | 1 | 1 | 0 | 0 |
| 0 | 1 | 1 | 0 | 1 | 0 | 0 |
| 0 | 1 | 1 | 1 | 1 | 0 | 1 |
| 1 | 0 | 0 | 0 | 0 | 1 | 0 |
| 1 | 0 | 0 | 1 | 1 | 0 | 0 |
| 1 | 0 | 1 | 0 | 1 | 0 | 0 |
| 1 | 0 | 1 | 1 | 1 | 0 | 1 |
| 1 | 1 | 0 | 0 | 0 | 1 | 1 |
| 1 | 1 | 0 | 1 | 1 | 1 | 1 |
| 1 | 1 | 1 | 0 | 1 | 1 | 1 |
| 1 | 1 | 1 | 1 | 1 | 1 | 0 |

Fig. 12

| Data | Symb. 1 | Symb. 2 | A1 | A2 |
|---|---|---|---|---|
| 000 | 1 | 2 | 0 1 | 0 0 |
| 001 | 1 | 3 | 0 1 | 0 1 |
| 010 | 2 | 1 | 1 0 | 0 0 |
| 011 | 3 | 1 | 1 0 | 1 0 |
| 100 | 3 | 3 | 1 1 | 1 1 |
| 101 | 2 | 3 | 1 1 | 0 1 |
| 110 | 2 | 2 | 1 1 | 0 0 |
| 111 | 3 | 2 | 1 1 | 1 0 |

Fig. 13

DEVICE AND METHOD FOR TRANSMITTING OPTICAL DATA SIGNALS

CROSS-REFERENCE TO RELATED APPLICATIONS

This application claims the benefit of German patent application No. 10 2008 017 644.3, filed Apr. 4, 2008, the entire disclosure of which is herein incorporated by reference.

FIELD OF THE INVENTION

The present invention relates to a device and a method for transmitting an optical data signal over an optical transmission channel using electrical and optical components with comparatively narrow bandwidths.

BACKGROUND OF THE INVENTION

In conventional systems for transmitting optical data signals, electro-optical components (parts) whose frequency bandwidth corresponds to the data rate to be transmitted are used for transmitting signals of a predetermined frequency bandwidth over an optical data channel. Thus, in conventional systems for transmitting optical data signals, the data transmission rate or information rate with which data information is modulated onto an optical carrier is limited by the bandwidth of the used component parts. For example, for transmission rates of 10 Gbaud and 40 Gbaud, the necessary component parts allowing a data transmission rate of 10 or 40 Gbaud are commercially available. However, for higher data transmission rates of e.g. 100 Gbaud, component parts with a corresponding frequency bandwidth are not available.

SUMMARY OF THE INVENTION

It is an object of the present invention to provide a device or a method for transmitting an optical data signal over an optical transmission channel, in which the data are transmitted with a data transmission rate that is larger than the frequency bandwidth of the electro-optical components that are used for this.

Accordingly, a device for transmitting an optical data signal over an optical transmission channel is provided, the device comprising:
  a differential phase shift keying unit for differential phase shift key coding of at least one serial data stream to generate a differential phase shift keying coded data stream;
  an amplitude shift keying unit for amplitude shift key coding of at least two further serial data streams that can be selectively activated with controllable switches to generate an amplitude shift keying coded data stream, wherein the switches are controlled in accordance with an operation mode control signal;
  a modulation unit for generating an optical data signal in accordance with a control signal that is formed from the generated differential phase shift keying coded data stream and from the generated amplitude shift keying coded data stream.

In one embodiment of the device, the modulation unit is a Mach-Zehnder modulator.

In one embodiment of the device, a multiplication unit is provided that forms the control signal for the modulation unit by multiplication of the differential phase shift keying coded data stream with the amplitude shift keying coded data stream.

In one embodiment of the device, the a demultiplexer is provided that partitions a serial data stream having a high data transmission rate into a plurality of serial data streams having a reduced data transmission rate.

In one embodiment of the device, the two of the serial data streams having a reduced data transmission rate are output by the demultiplexer to the differential phase shift keying unit.

In one embodiment of the device, the other serial data streams having a reduced data transmission rate are output by the demultiplexer to the amplitude shift keying unit.

In one embodiment of the device, the serial data streams having a reduced transmission rate that are output to the amplitude shift keying unit can be respectively selectively activated by the controllable switches.

In one embodiment of the device, the differential phase shift keying unit comprises:
  a multiplexer that switches alternatingly between two serial data streams and outputs a data stream at an output port of the multiplexer;
  an XOR gate arranged downstream from the multiplexer, the XOR gate having a first input port that is connected to the output port of the multiplexer and a second input port that is connected via a delay element to an output port of the XOR gate.

In one embodiment of the device, the differential phase shift keying unit comprises a first XOR gate receiving a serial data stream at a first input port and receiving at a second input port an output signal that is fed back from an output port of a second XOR gate via a delay element, and a multiplexer arranged downstream of the XOR gates that switches alternatingly between the output ports of the two XOR gates.

In one embodiment of the device, the delay time of the delay element is inversely proportional to the data rate of the serial data stream at the input ports of the XOR gate.

In one embodiment of the device, the amplitude shift keying unit comprises:
  a storage for storing a coding table that can be read out, in which a bit combination of amplitude bits is stored for any bit combination of the serial data streams input into the amplitude shift keying unit;
  a multiplexer for multiplexing the amplitude bits that are read out from the storage;
  amplifiers with adjustable amplification factors for amplifying the multiplexed amplitude bits; and
  an adder that adds amplified amplitude bits output by the amplifiers to generate the amplitude shift keying coded data stream.

In one embodiment of the device, the amplification factors of the amplifiers in the amplitude shift keying unit are adjusted by a controller in accordance with a detected error rate that occurs when transmitting the optical data signal over the optical transmission channel to a receiver.

In one embodiment of the device, the detected error rate is transmitted from the receiver over a communication channel to the controller.

In one embodiment of the device, the serial data stream having a high data transmission rate has a data transmission rate of 100 Gbaud.

In one embodiment of the device, the serial data streams having a reduced data transmission rate each have a data transmission rate of 20 Gbaud.

In one embodiment of the device, the generated differential phase shift keying coded data stream and the generated amplitude shift keying coded data stream each have a data transmission rate of 40 Gbaud.

Furthermore, a method for transmitting an optical data signal over an optical transmission channel is provided, the method comprising the following steps:

- forming a differential phase shift keying coded data stream from serial data streams;
- forming an amplitude shift keying coded data stream from further serial data streams, wherein the further serial data streams are selectively activated in accordance with an operation mode control signal;
- generating the optical data signal with a modulation unit in accordance with a control signal that is formed from the differential phase shift keying coded data stream and the amplitude shift keying coded data stream.

BRIEF DESCRIPTION OF THE DRAWINGS

The present invention is explained in more detail below using preferred exemplary embodiments and with reference to the attached figures of the drawings, in which:

FIG. 6 is a table that is stored in a storage of an amplitude shift keying unit according to FIG. 5;

FIG. 7 is another table that is stored in a storage of an amplitude shift keying unit according to FIG. 5;

FIG. 12 is an example of a table that is implemented in the receiver shown in FIG. 11;

FIG. 13 is an example of a further table that is implemented in the sender shown in FIG. 5;

In the figures, like reference numerals refer to identical or functionally identical components unless otherwise stated.

DETAILED DESCRIPTION OF THE INVENTION

Referring to the appended drawings, the following is an explanation of embodiments of a device and a method for transmitting an optical data signal in accordance with the present invention.

Figure 1:
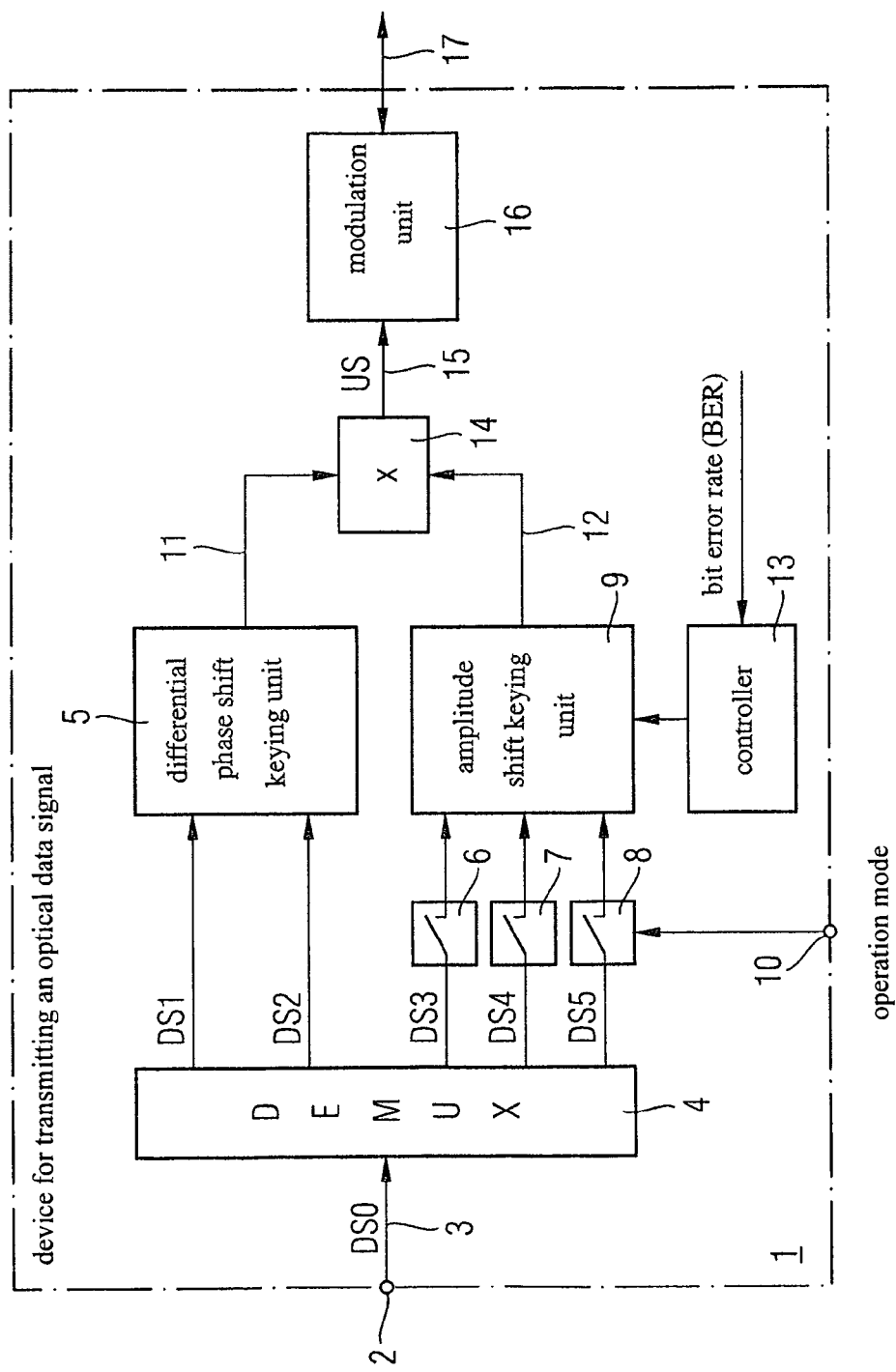
FIG. 1 is a block diagram of one possible embodiment of a device for transmitting an optical data signal in accordance with the present invention.

As can be seen in FIG. 1, which shows an embodiment of a device 1 for transmitting an optical data signal in accordance with the present invention, this device 1 comprises a signal input port 2 for receiving a serial data stream having a high data transmission rate. The serial data stream having a high data transmission rate is supplied via an internal conductor 3 to a demultiplexer 4 that is part of the device 1. The demultiplexer 4 partitions the serial data stream DS0 having a high data transmission rate into a plurality of data streams DS having a reduced data transmission rate. In the embodiment shown in FIG. 1, the demultiplexer 4 partitions the serial data stream DS0 having a high data transmission rate into five data streams DS1-DS5 having a lower data transmission rate.

In the embodiment shown in FIG. 1, the signal input port 1 receives a serial data stream having a high data transmission rate from a data source. This serial data stream is then partitioned by the demultiplexer 4 into different serial data streams having a reduced data transmission rate. In an alternative embodiment of the inventive device 1 for transmitting an optical data signal, the device 1 may receive different serial data streams having a low data transmission rate, in which case this embodiment is not provided with a demultiplexer 4. In one possible embodiment of the inventive device 1, the received serial data stream DS0 having a high data transmission rate has a high data transmission rate of 100 Gbaud. The demultiplexer 4 partitions this serial data steam DS0 into several serial data streams DS having a reduced data transmission rate, each having a data transmission rate of e.g. 20 Gbaud. In one possible embodiment of the inventive device 1, the five parallel data streams are subsequently supplied to a 5-fold FEC coding unit for FEC preceding. The embodiment shown in FIG. 1 is provided with a coding unit.

In the embodiment shown in FIG. 1, two of the serial data streams, that is, the serial data streams DS1 and DS2 are delivered by the demultiplexer 4 directly to a differential phase shift keying unit 5 (phase difference coding unit). The other three data streams DS3-DS5 are delivered via controllable switches 6, 7 and 8 to an amplitude shift keying unit 9 (amplitude coding unit). The controllable switches 6, 7 and 8 are controlled in accordance with an operation mode control signal that is input to a control input port 10 of the device 1. The differential phase shift keying unit 5 performs differential phase shift keying (phase difference coding) of the two serial data streams DS1 and DS2 supplied to it, in order to generate a differential phase shift keying coded data stream. The generated differential phase shift keying coded data stream is output from the differential phase shift keying unit 5 via a conductor 11. In the illustrated embodiment, the differential phase shift keying coded data stream has a data transmission rate of 40 Gbaud. In the embodiment shown in FIG. 1, two serial data streams DS1 and DS2 are coded by the differential phase shift keying unit 5 in order to generate a differential phase shift keying coded data stream. In an alternative embodiment, it is also possible to directly modulate a serial data stream with twice the data rate. A partial control signal is generated, with which the downstream modulation unit modulates information in form of a phase difference onto the optical signal.

The amplitude shift keying unit 9 performs amplitude coding of the other serial data streams DS3, DS4 and DS5, which can be selectively activated, in order to generate an amplitude-coded data stream. This amplitude-coded data stream is output from the amplitude shift keying device 9 via a conductor 12. In the illustrated embodiment, the generated amplitude-coded data stream has a data transmission rate of 40 Gbaud. The amplitude coding by the amplitude shift keying unit 9 is based on one data stream, two data streams, or three data streams D3, D4, D5, which can be selectively activated by the switches 6, 7 and 8 depending on the operation mode control signal. Moreover, amplification factors that depend on a control signal generated by an internal controller 13 of the device can be set by signal amplifiers included in the amplitude shift keying unit 9. The control signals for the signal amplifiers are set in accordance with an error rate that the device 1 obtains from the receiving side. In one possible embodiment, this error rate, for example the bit error rate (BER), is communicated to the internal controller 13 of the device via the optical communication channel. In an alternative embodiment, the error rate for the various data streams is communicated to the controller 13 via a separate control channel.

A control signal is formed from the differential phase shift keying coded data stream that is output by the differential phase shift keying unit 5 and the amplitude difference coded data stream that is output by the amplitude difference coding unit 9. In the embodiment shown in FIG. 1, the differential phase shift keying coded data stream is multiplied by a multiplication unit 14 with the amplitude shift keying coded data stream in order to generate a control signal. The control signal $U_s$ that is formed by the multiplication of the differential phase shift keying coded data stream with the amplitude shift keying coded data stream is output via an internal conductor 15 to a modulation unit 16. In one possible embodiment, the modulation unit 16 is a Mach-Zehnder modulator. The modulation unit 16 generates the optical data signal in dependence of the control signal $U_s$ that is applied via the conductor 15 and outputs the generated optical data signal via an optical transmission channel 17. In one possible embodiment, the modulation is effected by driving a symmetric Mach-Zehnder interferometer, which is biased in a zero point, with a hexavalent (six-value) voltage signal.

In the embodiment of the inventive device 1 as illustrated in FIG. 1, the serial data stream DS0 having a serial data rate of 100 Gbaud is partitioned into five parallel data streams of 20 Gbaud each. Two of these parallel data streams are modulated by differential phase shift keying modulation onto a 40 Gbaud optical signal, whereas the information of the remaining three data streams is transmitted by the amplitude coding device 9 in two consecutive symbols. In order to enable a differential decoding of the phase modulation and thus a more simple decoding of the signal on the receiving side in a delay line interferometer, the two data streams DS1 and DS2 to be coded in-phase are precoded in a preferable embodiment. Since the signals are available at half the symbol rate, in one possible embodiment this preceding can be performed at a low rate. For example, a binary 0 can be coded in a data stream in such a manner that there is no phase change of the optical signal, whereas a binary 1 in the data stream can be coded to a phase change of 180°. This definition is subsequently also observed for the decoding on the receiving side.

Figure 2:
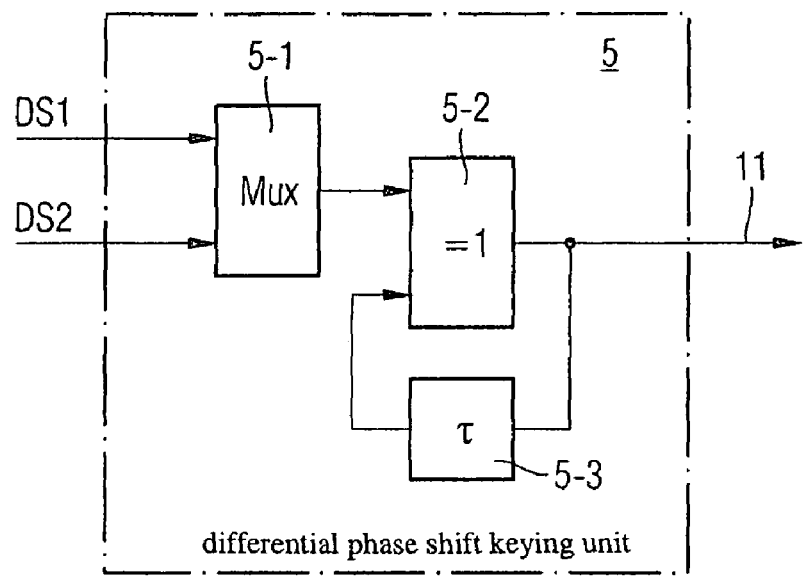
FIG. 2 is a block diagram of a possible embodiment of a differential phase shift keying unit included in the device according to the present invention.
Figure 3:
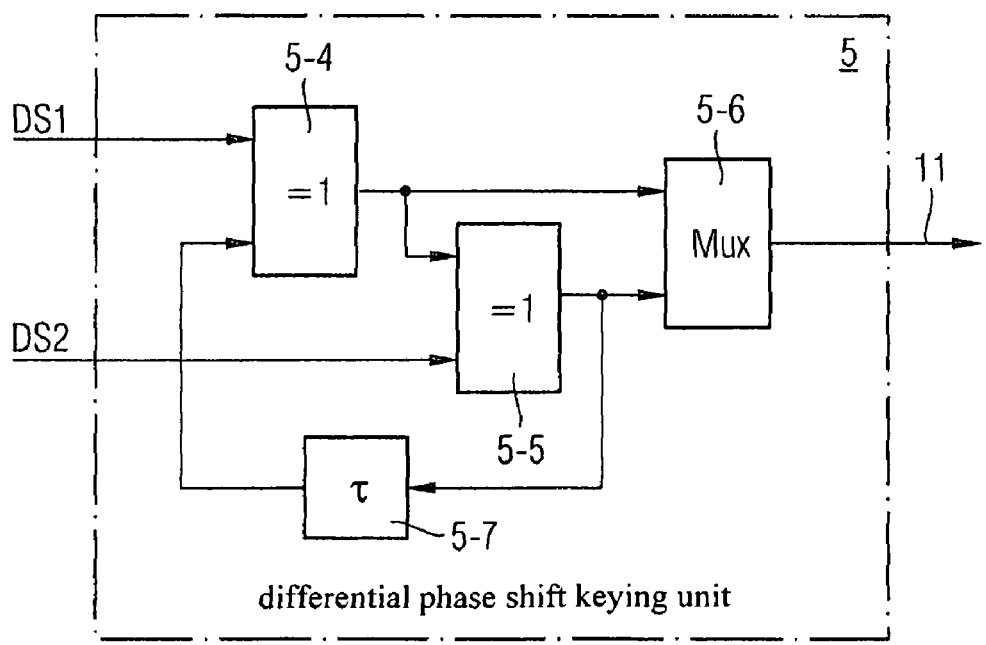
FIG. 3 is a block diagram of a further embodiment of a differential phase shift keying unit included in the device according to the present invention.
Figure 4:
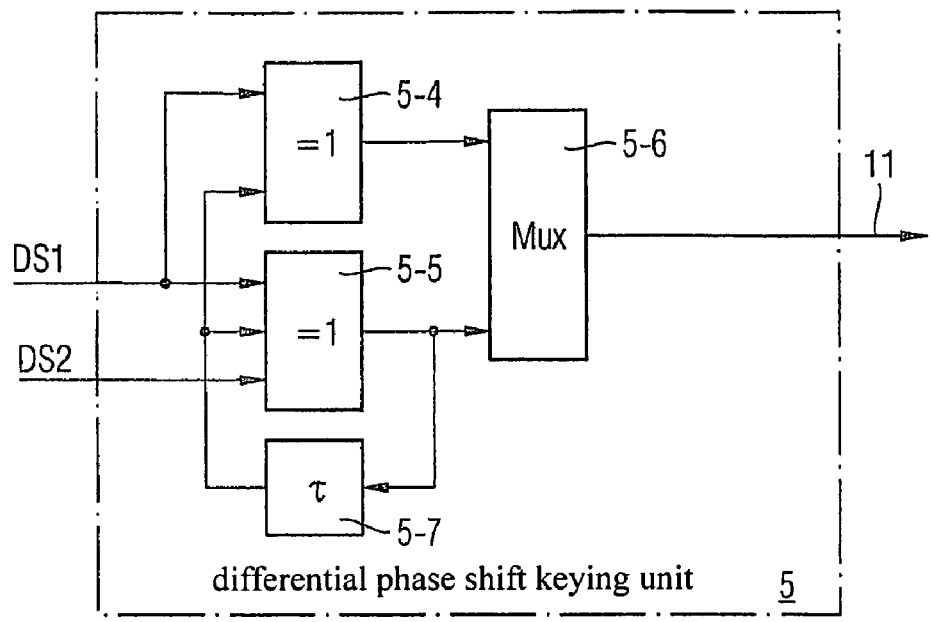
FIG. 4 is a block diagram of a further embodiment of a differential phase shift keying unit included in the device according to the present invention.

The FIGS. 2-4 show different embodiments for a differential phase shift keying unit 5. In the differential phase shift keying unit 5 illustrated in FIG. 2, the precoding is carried out after the multiplexing, whereas in the embodiments illustrated in FIGS. 3 and 4, the precoding is carried out prior to the multiplexing. In the embodiment shown in FIG. 2, the precoding is carried out after multiplexing the two 20 Gbaud data streams to a 40 Gbaud data stream, by feeding back the coded signal and combining it with the signal to be coded in an XOR gate. A multiplexer 5-1 alternatingly puts one of the two applied serial data streams DS1, DS2 through to an output port of the multiplexer. An XOR gate 5-2 downstream from the multiplexer 5-1 comprises a first input port that is connected to the output port of the multiplexer 5-1. An output port of the XOR gate is connected (fed back) via a delay element 5-3 to a second input port of the XOR gate 5-2. The output port of the differential phase shift keying unit 5 is connected via the conductor 11 with the multiplier 14 illustrated in FIG. 1.

FIG. 3 shows another embodiment of a differential phase shift keying unit 5. The differential phase shift keying unit 5 according to FIG. 3 comprises two XOR gates 54 and 5-5, whose output ports are connected to a multiplexer 5-6. The output port of the second XOR gate 5-5 is connected via a delay element 5-7 to the second input port of the first XOR gate 54. The multiplexer 5-6 switches alternatingly between the two outputs of the two XOR gates 54 and 5-5 and outputs a 40 Gbaud differential phase shift keying coded data signal to the conductor 11.

FIG. 4 illustrates a third example of a differential phase shift keying unit 5. In the example of a differential phase shift keying unit 5 shown in FIG. 4, the second XOR gate 5-5 comprises three input ports, the two serial data streams DS1 and DS2 being input to two of those input ports and a signal fed back from the output port of the XOR gate 5-5 via the delay element 5-7 being input to the third of those input ports. The first XOR gate 5-4 receives at its first input port the first serial data stream DS1 and the feedback signal at its second input port. The multiplexer 5-6 switches alternatingly between the two output ports of the two XOR gates and outputs a 40 Gbaud differential phase shift keying coded signal via the signal conductor 11.

In one possible embodiment of the inventive device 1, the delay time of the delay elements 5-3 and 5-7 illustrated in FIGS. 2, 3 and 4 is inversely proportional to the data rate of the serial data streams DS1 and DS2 applied to the input ports. For example, the delay time of the delay element 5-3 shown in FIG. 2 may be 25 ps (picoseconds). In the examples shown in FIGS. 4 and 5, the delay time of the delay elements 5-7 may be for example 50 ps.

The remaining three data streams DS3, DS4 and DS5 having 20 Gbaud, respectively, are transmitted by the amplitude shift key coding in two consecutive data symbols. In one possible embodiment, each data symbol receives one of the three possible amplitude values A1, A2 and A3, where A1<A2<A3.

In a preferred embodiment, it is avoided that both symbols take on the value A1, in order to minimize the combination of symbols with the lowest amplitude when decoding the phase signal with a delay line interferometer on the receiver side. In addition, by avoiding this symbol combination, it is possible to attain a criterion for synchronizing the symbol pairs. When the value A1 is decoded in two consecutive symbols, then these are not assigned to a symbol pair.

FIG. 6 shows a possible mapping of bit values of the three serial data streams DS3, DS4 and DS5 to the amplitude values in two consecutive symbols.

Figure 5:
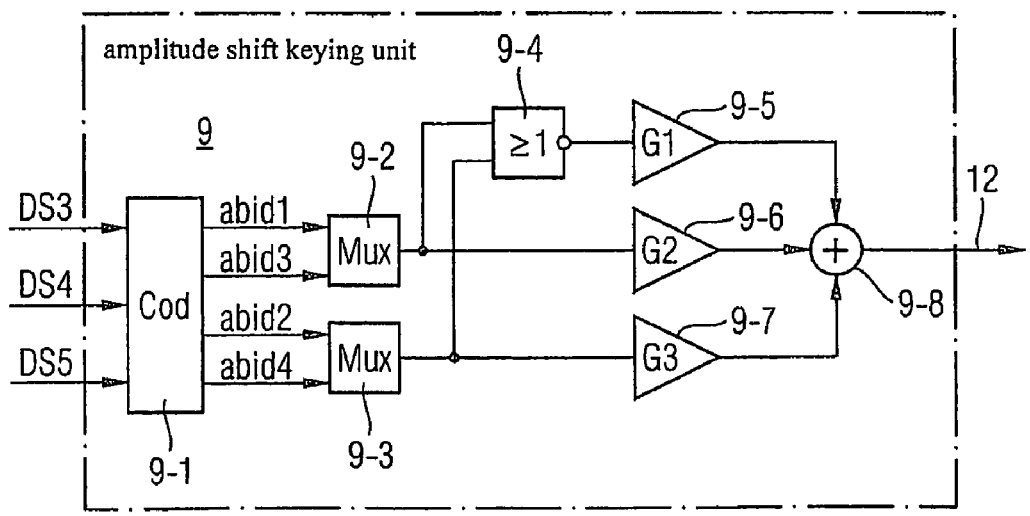
FIG. 5 is a block diagram of a possible embodiment of an amplitude shift keying unit in the device for transmitting an optical data signal according to the present invention.

The amplitude modulation values A1, A2 and A3 listed in the table of FIG. 6 are generated for example by the circuit shown in FIG. 5 from the bit values of the three parallel data streams DS3, DS4 and DS5. The embodiment of the amplitude shift keying unit 9 shown in FIG. 5 includes a storage 9-1 with a readable coding table. FIG. 7 shows the coding table stored in storage 9-1 in one possible embodiment of the amplitude shift keying unit 9. For each bit combination of the data streams DS3, DS4 and DS5 that are input into the amplitude shift keying unit 9, a bit combination of the amplitude bits abit1, abit2, abit3 and abit4 is stored. In the embodiment shown in FIG. 5, four bit streams also having 20 Gbaud each are generated from the serial data streams DS3, DS4 and DS5 respectively comprising 3 bit by reading the coding table. The amplitude bits abit1 and abit3 are multiplexed by a first multiplexer 9-2 and the amplitude bits abit2 and abit4 are multiplexed by a second multiplexer 9-3. Thus, two data streams with a data transmission rate of 40 Gbaud each are generated. The two data streams having 40 Gbaud are combined by a NOR gate 94 and amplified by a first signal amplifier 9-5. Moreover, the two resulting data streams that are output by the multiplexers 9-2 and 9-3 are each amplified by a signal amplifier 9-6, 9-7, respectively. In one embodiment of the inventive device 1, the signal amplifying factors of the three signal amplifiers 9-5, 9-6 and 9-7 are adjustable. The amplification values of the signal amplifiers 9-5, 9-6 and 9-7 determine the values of the three data levels of the modulated optical signal. In the embodiment shown in FIG. 5, the output signals of the signal amplifiers 9-5, 9-6 and 9-7 are given to an adder 9-8, which adds the three amplified amplitude bits output by the signal amplifiers 9-5, 9-6 and 9-7 to generate the amplitude shift keying coded data stream. The generated amplitude shift keying coded data stream is output via the conductor 12 to the multiplier 14 shown in FIG. 1.

Figure 8A:
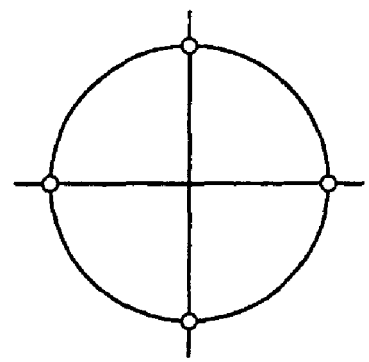
FIG. 8A-8C are constellation diagrams illustrating the operation of the device for transmitting an optical data signal in accordance with the present invention.
Figure 8B:
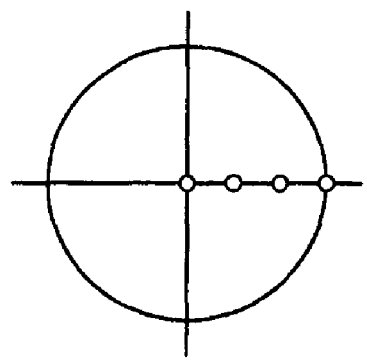
Figure 8C:
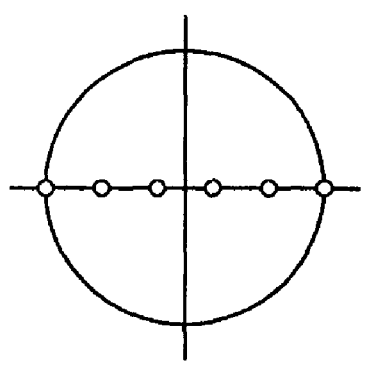

The FIGS. 8A, 8B and 8C illustrate the operation of the inventive device 1 for transmitting an optical data stream. In multi-value modulation methods, more than one information bit is transmitted within one information step or information symbol. The amount of information I that is transmitted per symbol is given by:

$I=\log_2(S)$, where $\log_2$ is the base 2 logarithm and S is the number of possible symbol states. In QPSK modulation as shown in FIG. 8A, the optical signal can take on one of the phase states 0°, 90°, 180° and 270°. Since there are four distinct symbol states S, $\log_2(4)=2$ bit are transmitted per symbol.

FIG. 8B shows a multi-level amplitude modulation method in which the optical signal is transmitted not only with two amplitudes corresponding to the values 0 and 1, but in which also intermediate levels such as 0.3 and 0.6 are allowed. A corresponding constellation diagram of a four-level 4-ASK-modulation is shown in FIG. 8B.

FIG. 8C shows a constellation diagram that is used with one possible embodiment of the inventive device 1 for transmitting an optical data signal. A combined phase-amplitude modulation is carried out in accordance with the constellation diagram shown in FIG. 8C. A three-level amplitude modulation with three amplitude values A1, A2 and A3 is combined with a 180° phase shift keying. The modulation is carried out by driving a symmetric MZ modulation unit 16 that is biased in the zero point, with a hexavalent (six-value) control voltage signal $U_s$. In the constellation diagram shown in FIG. 8C, the amount of information that is transmitted per symbol is $I=\log_2(6)=2.5$ bit. With this, it is possible to achieve a data transmission rate of 100 Gbaud with a symbol rate of <40 Gbaud. For this, the data stream DS0 having a high data transmission rate of 100 Gbaud is partitioned into for example five parallel data streams DS1-DS5 with 20 Gbaud each, as in the embodiment shown in FIG. 1. Two parallel data streams DS1 and DS2 are subsequently modulated onto a 40 Gbaud optical data signal by the differential phase shift keying unit 5, while the information of the remaining three data streams DS3, DS4 and DS5 is transmitted by amplitude modulation in two consecutive data symbols.

Figure 9A:
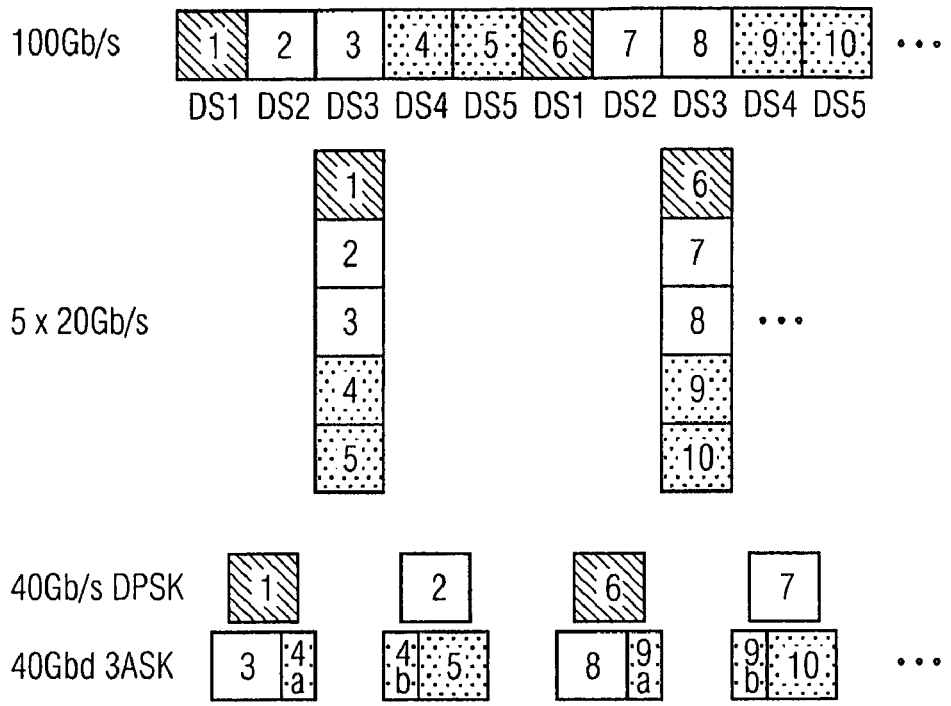
FIG. 9A, 9B are diagrams illustrating the operation of the device for transmitting an optical data signal in accordance with the present invention.
Figure 9B:
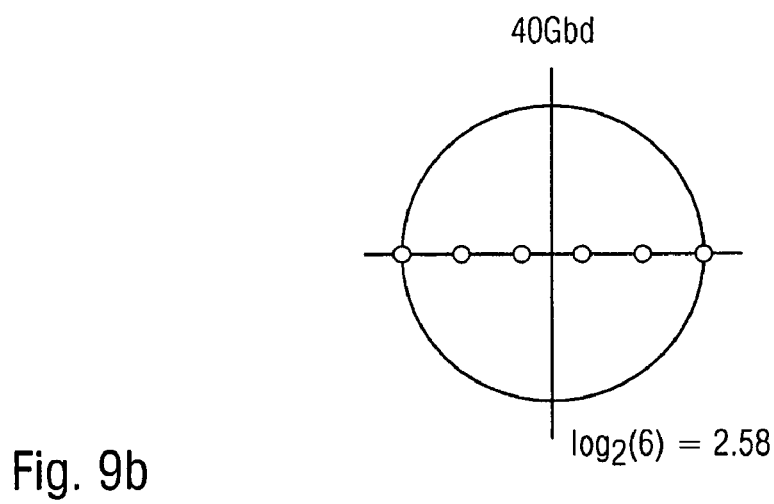

FIGS. 9A and 9B illustrate the operation of the inventive device 1. FIG. 9B shows a 3-ASK-PSK modulation constellation diagram for a 40 Gbaud data stream having six different symbol states.

As can be seen in FIG. 9A, the serial data stream DS0 having a high data transmission rate of for example 100 Gbaud is partitioned into five data streams DS1-DS5 of 20 Gbaud each. 2.5 bit are transmitted per symbol, in other words, five bits are transmitted in two consecutive symbols.

Figure 10:
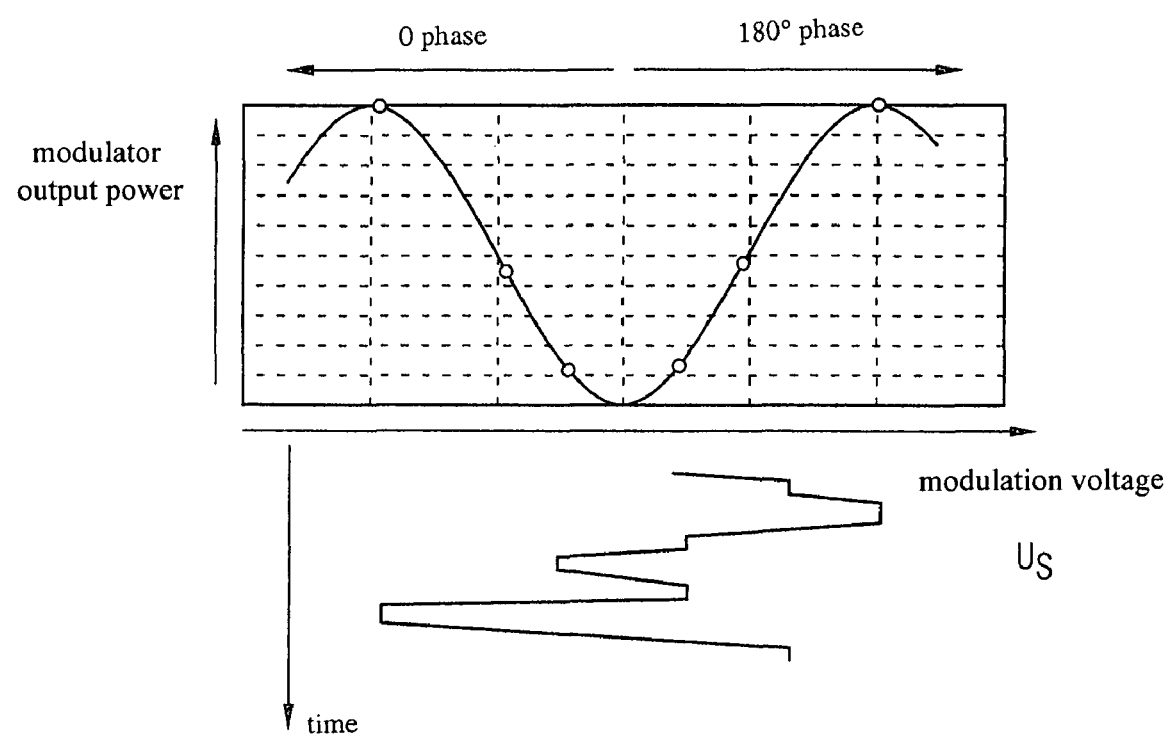
FIG. 10 is a diagram illustrating the operation of the modulation unit in the device according to the present invention.

FIG. 10 illustrates the principle of the phase/amplitude modulation using a single Mach-Zehnder modulator that is used as a modulation unit 16. The modulation is carried out by driving the symmetric Mach-Zehnder interferometer, which is biased in the zero point, e.g. with a six-value control voltage signal $U_s$. Thus, an elaborate nested MZ modulator as needs to be provided for the modulation of QPSK signals is not necessary.

Figure 11:
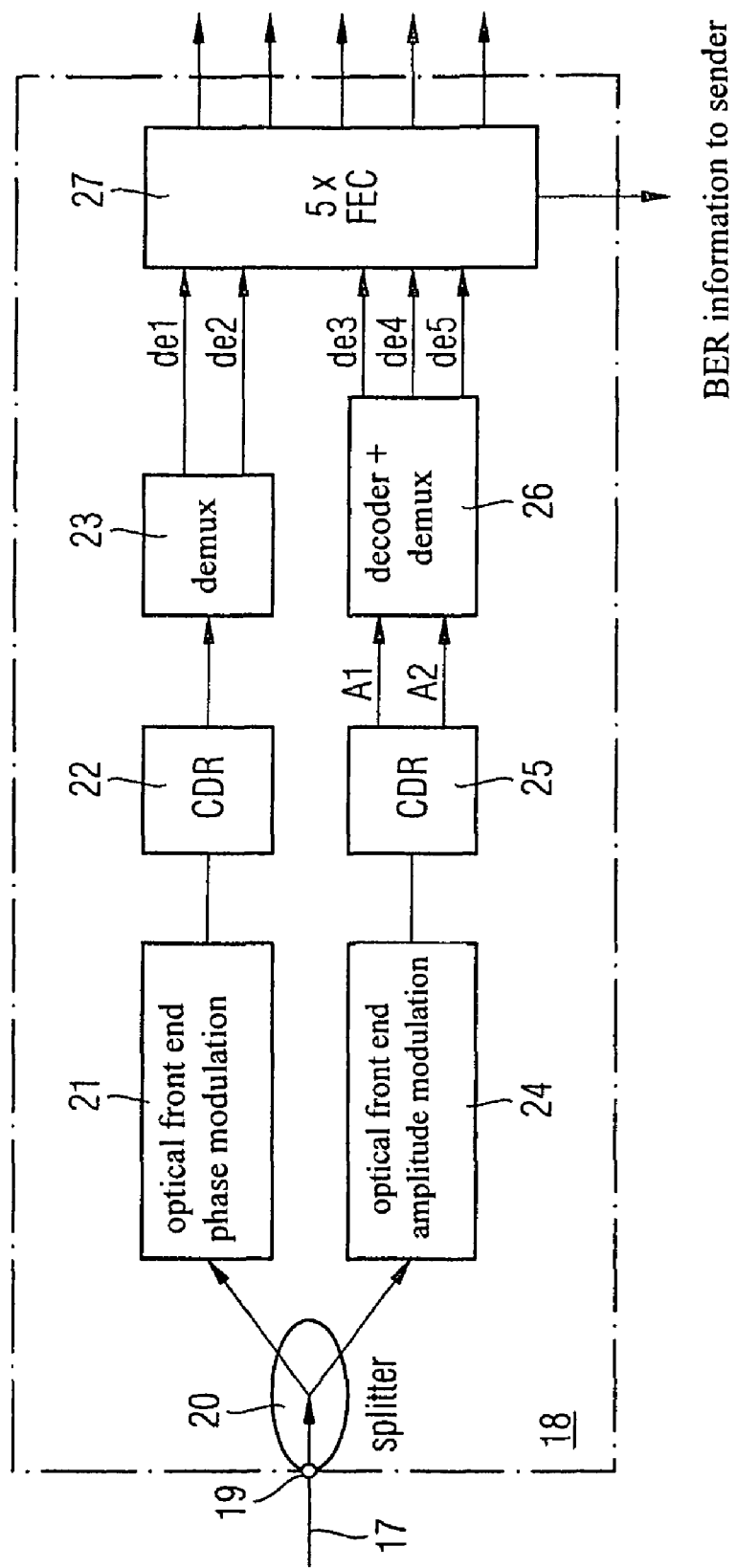
FIG. 11 is a block diagram of a possible embodiment of a receiver according to the present invention.

FIG. 11 shows a circuit diagram of a receiver 18 that receives and decodes the optical data signal that is transmitted over the optical transmission channel 17. The receiver 18 receives the transmitted optical data signal at the signal input port 19. The received optical signal is split by a splitter 20 to two signal branches. In a first signal branch, the phase modulation (DPSK) of the received optical signal is detected after a delay line interferometer 21, for example with two balanced photodiodes. After clock recovery with a clock recovery unit 22 (CDR: clock and data recovery), the resulting signal is sampled by a demultiplexer 23 and is partitioned into two data streams. The data stream having 40 Gbaud that is recovered after the clock recovery is partitioned by the demultiplexer 23 into two data streams de1 and de2, which each have a data transmission rate of 20 Gbaud.

In the second signal branch of the receiver 18, the optical signal that is received by a unit 24 is detected directly by a photodiode. The signal clock is recovered by a subsequent clock recovery unit 25 and the received signal is sampled by a decoding and demultiplexing unit 26, which has for example two decision thresholds. Preferably, one decision threshold for the first output data stream is situated between the amplitude levels A1 and A2 and the other decision threshold for the other output data stream is situated between the amplitude levels A2 and A3. The decoding and demultiplexing unit 26 generates three further output data streams de3, de4 and de5. The generated five serial data streams de1, de2, de3, de4 and de5 are supplied to an FEC (forward error correction) unit 27, which determines the attained error rate or bit error rate (BER) for each of the five received serial data streams de1-de5. The error rates or BERs that are determined in this manner are provided over a separate channel to the internal controller 13 of the device 1 for transmitting an optical data signal, as shown in FIG. 1. In one possible embodiment, the internal controller 13 can adjust the signal amplification factors of the signal amplifiers included in the amplitude shift keying unit 9 with the aid of these error rates.

FIG. 12 shows a table that is stored within a storage of the decoding and demultiplexing unit 26.

If the received signal is smaller than a lower decision threshold (that is, level 1), then the deciders in the decoding and demultiplexing unit 26 generate a logical 0 for both data streams. If the received signal is between the two decision thresholds, then the data stream A1 is decided to be logical 1 and the data stream A2 is decided as logical 0. If the received signal is above the two decision thresholds (that is, at level 3), then both data streams receive a logical 1. These decisions are made for both coded symbols. The resulting signal level is then determined with a numerical approach from the data A1 and A2 of a symbol: signal level=A1+A2+1.

The resulting output data streams de3, de4 and de5 are determined using the decoding table shown in FIG. 12.

In one possible embodiment, the control of the amplification factors of the signal amplifiers 9-5, 9-6 and 9-7 of the amplitude shift keying unit 9 shown in FIG. 5 is carried out in accordance with the bit error rates BER1, BER2, BER3, BER4 and BER5, that are determined by the FEC unit 27, as follows:

If (BER1+BER2)/2>BER3, then the signal amplification factor of the signal amplifier 9-5 is increased.

If (BER1+BER2)/2<BER3, then the signal amplification factor of the signal amplifier 9-5 is reduced.

If BER3>BER5, then the signal amplification factor of the second signal amplifier 9-6 is increased.

If BER3<BER5, then the signal amplification factor of the second signal amplifier 9-6 is reduced.

In this embodiment, the signal amplification factor of the third signal amplifier 9-7 stays constant. The adder 9-8 of the amplitude shift keying unit 9 outputs a ternary (having three values) data stream having a data transmission rate of 40 Gbaud.

In one possible embodiment of the inventive method for data transmission of an optical data signal, the transmission behaviour of the ASK-DPSK modulation method is optimized. In one possible embodiment, the decision threshold is shifted in such a mannter that the error rate of the received signal is minimized. The error rate or bit error rate can be determined by evaluating an FEC algorithm with the FEC unit 27. In an alternative embodiment, certain overhead bytes or header data of a packet data transmission can be evaluated in order to determine the error rate or bit error rate BER.

In the inventive device 1, for example three independent decision thresholds are optimized. In order to receive an unambiguous error signal for the feedback for optimizing the decision threshold, in other words, an error signal that depends only on the setting of a single decision threshold and that stays nearly constant when changing the other two decision thresholds, it is possible to use a predetermined coding algorithm.

In an alternative embodiment, to optimize the transmission behaviour of the 3-ASK-DPSK modulation method, the modulation levels are changed until an optimal error rate is set. The change of the modulation levels influences all transmitted data. For example, a reduction of the lowermost level leads to an increase of the error rate of the DPSK coded data component, whereas the error rate of the 3-ASK coded signal component is improved. A change of the middle modulation level, on the other hand, does not lead to a change of the DPSK error rate, however, the error rate of the 3-ASK data component is changed depending on the coding algorithm. In one possible embodiment, a coding algorithm is used, that enables a differentiation of the resulting errors in an upper and in a lower eye of the 3-ASK signal.

In case of a combined optimization of the decision threshold and the modulation level, the optimization of the decision threshold is preferably carried out faster than the change of the modulation levels, so that in case of a change of the modulation levels the received signal is first error optimized by adjusting the decision threshold, before making a conclusion about the influence of the change of the modulation level. Thus, it can be prevented that the control algorithm becomes instable.

FIG. 13 shows a table listing an optimized coding of the ASK component of the device 1. In this embodiment, the ASK signal component is code in such a manner that in case of an error in the decision between the lower and the middle modulation level or in the decision between the middle and the upper modulation level, at least one of the respective coded bits of a symbol pair stays unaffected. The table in FIG. 13 shows an optimized coding rule, wherein three data bits are respectively coded into two three-level (or ternary) symbols.

For the decoding of the received signal on the receiving side with the receiver 18 shown in FIG. 11, two decisions are made for each symbol. One decision threshold is located for the first output data stream between the levels 1 and 2 and the other decision threshold is located for the other output data stream between the levels 2 and 3. If the received signal is smaller than the lower decision threshold (that is, level 1), then the deciders generate a logical 0 for both data streams. If the received signal is between the decision thresholds (that is, level 2), then the first data stream becomes a logical 1 and the other data stream becomes a logical 0. If the received signal is larger than both decision thresholds (that is, level 3), then both data streams take on a logical 1. These decisions are made for both coded symbols, so that in the ideal case, the bit pattern shown in the table of FIG. 13 are generated for the data streams.

When the decision thresholds are not set optimally, or when the signal distance is too low between the two levels, then in one possible embodiment, the signal levels can be recognized as being incorrect. In this case, there may be an incorrect decision between the levels 1 and 2, which means that the decision at the lower decision threshold is incorrect, or there is an incorrect decision between the levels 2 and 3, which means that the decision at the upper decision threshold is incorrect.

The coding of the ASK signal component shown in FIG. 13 is chosen in one embodiment such that the first case of an incorrect decision between the levels 1 and 2 leads only to bit errors in the first two bits of the bit triplet, whereas an incorrect decision between the levels 2 and 3 leads only to bit errors in the last two bits of the bit triplet. The result of this is that an error rate that is measured for the first bit of the bit triplet allows the control of the lower decision threshold and the lower eye opening, whereas an error rate for the last bit of the bit triplet allows the control of the upper decision threshold and the upper eye opening. Thus, this embodiment enables a clear control of the signal levels and the decision thresholds.

Figure 14A:
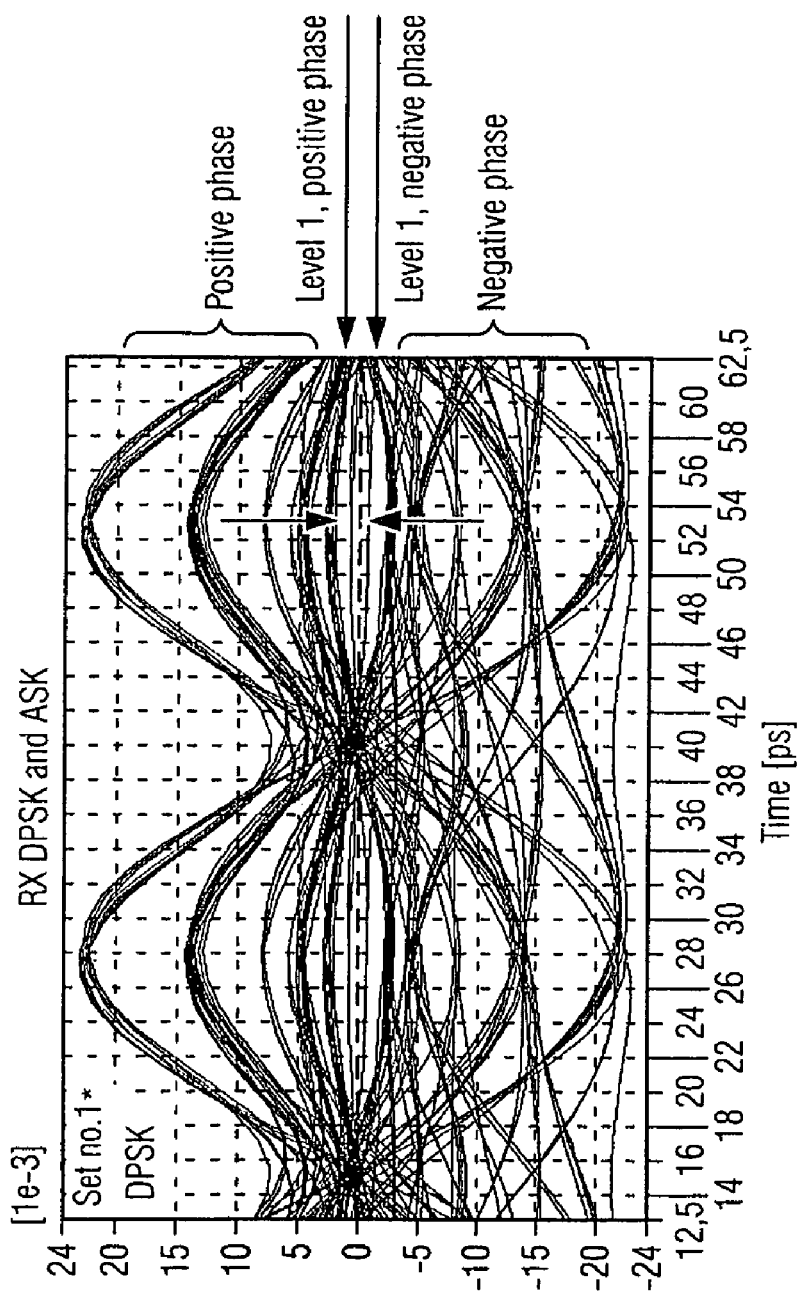
FIG. 14 is a signal diagram illustrating the operation of the device for transmitting an optical data signal in accordance with the present invention.
Figure 14B:
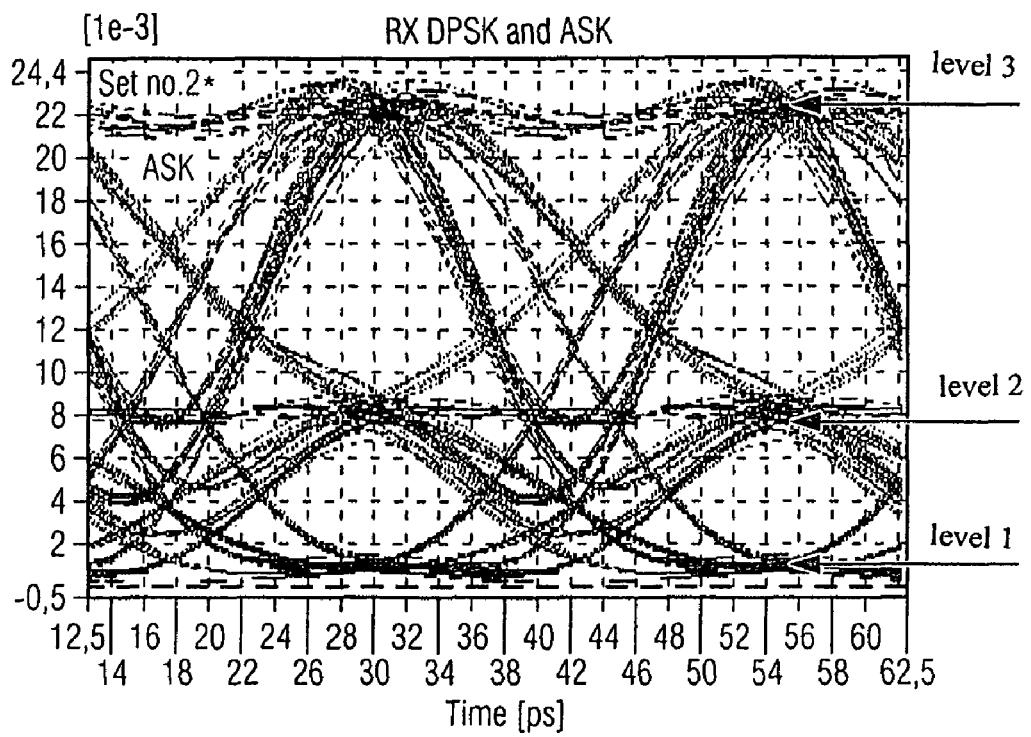

FIGS. 14A and 14B show the eye diagrams of a DPSK modulated signal and of an ASK modulated signal. FIG. 14A shows the eye diagram of a DPSK signal after DLI decoding. The upper part of the diagram corresponds to a 180° phase difference of the optical signal.

FIG. 14B shows the eye diagram of a 3-ASK signal. Here, the amplitude is modulated between three signal levels (level 1, level 2 and level 3).

Figure 14C:
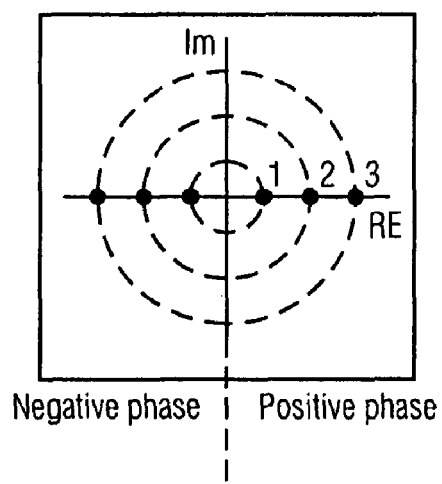

FIG. 14C shows a corresponding DPSK-3-ASK constellation diagram. Here, the amplitude is modulated between three signal levels and there is a 180° phase difference.

Figure 15A:
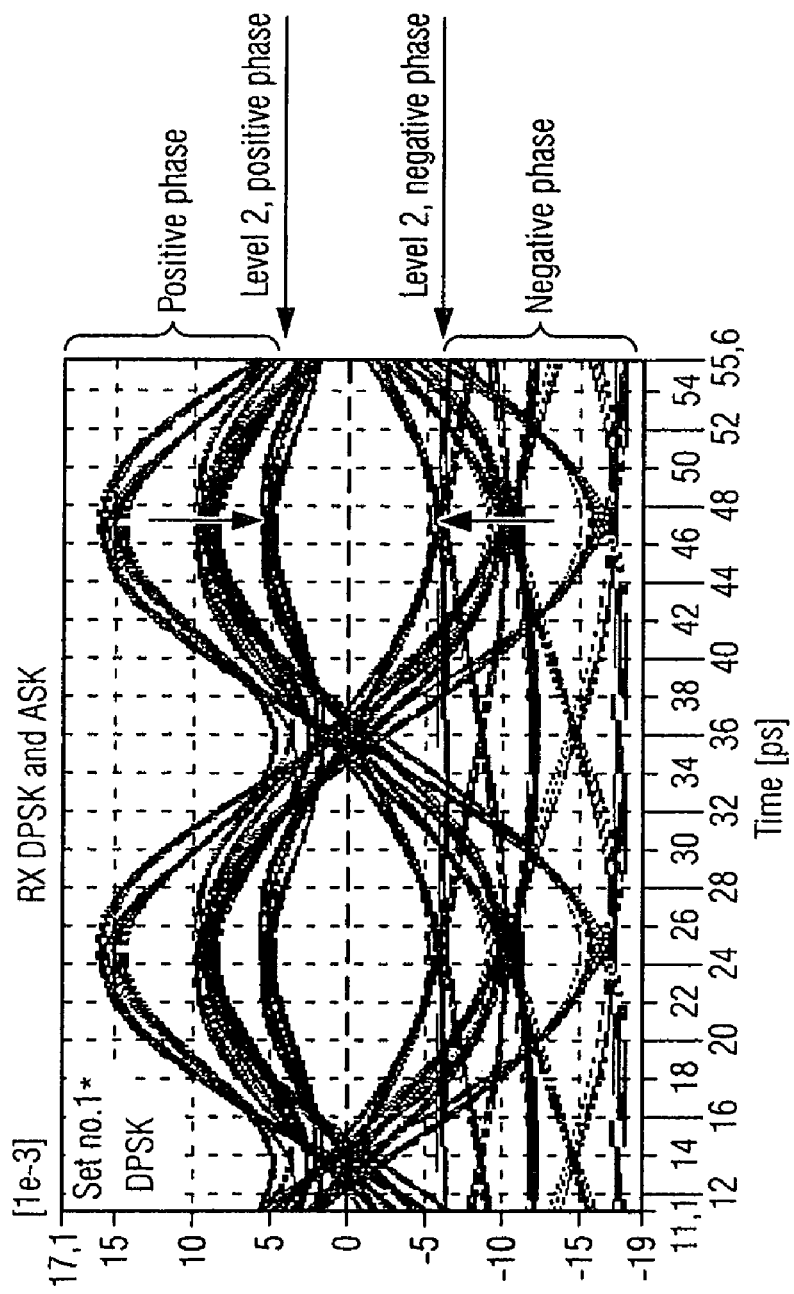
FIG. 15 is a further signal diagram illustrating the operation of the device according to the present invention.
Figure 15B:
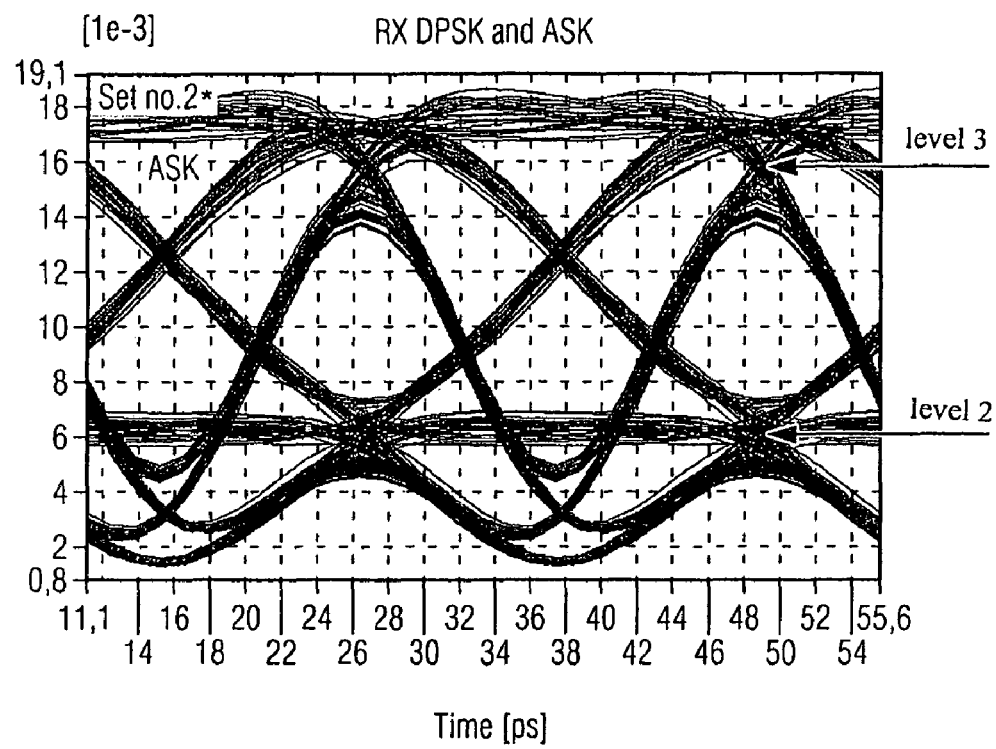
Figure 15C:
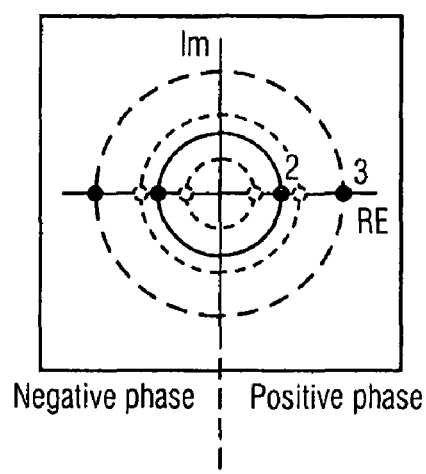

FIGS. 15A, 15B and 15C show eye diagrams for DPSK-2-ASK modulation methods and a corresponding eye diagram. FIG. 15A shows an eye diagram of a DPSK signal after DLI decoding. The upper portion of the eye diagram indicates a 180° phase difference of the optical signal and the negative portion of the constellation diagram shown in FIG. 15C. Compared to FIG. 14A, the eye distance in the middle of FIG. 15A is larger for the DPSK decision. The fact that this eye distance is larger than for the DPSK-3-ASK graph as shown in FIG. 14A affords an additional margin (of about 4 dB) for signal interferences while lowering the aggregated data transmission rate from 100 Gbaud to 80 Gbaud.

FIG. 15B shows an eye diagram for a 2-ASK signal. The amplitude of the signal is modulated between two levels (level 2 and level 3), which means that the level 1 shown in FIG. 14A is eliminated.

FIG. 15C shows the corresponding DPSK-2-ASK constellation diagram. The amplitude is modulated between two levels and can cause a relative phase shift of 180° between two values. Here, level 2 is shifted by one bit towards the point of origin of the coordinate system, in order to provide a better performance, which is attained due to the larger separation between the symbols.

With the inventive device 1, data information having a high information rate can be modulated onto an optical carrier using electrooptical components, that is, amplifiers, modulators and photodiodes with a bandwidth of about 30-40% of the information rate.

The inventive device 1 and the inventive method combine amplitude and phase modulation, transmitting for example six possible symbol states in one symbol. The modulation can be performed with a single Mach-Zehnder modulator. Even when using component parts with a relatively low frequency bandwidth, it is possible to attain a very high data transmission rate with the inventive device 1 or the inventive method.

If the number of amplitude levels is reduced for example from 3 to 2 and the corresponding coding/decoding scheme is modified accordingly, then the entire channel capacity can be reduced to a transmission rate of 80 Gb/s, so that noise or other signal interferences of about 4 decibel can be compensated.

What is claimed is:

1. A device for transmitting an optical data signal over an optical transmission channel, the device comprising:
   (a) a differential phase shift keying unit for differential phase shift key coding of at least one serial data stream to generate a differential phase shift keying coded data stream;
   (b) an amplitude shift keying unit for amplitude shift key coding of at least two further serial data streams that can be selectively activated with controllable switches to generate an amplitude shift keying coded data stream, wherein the switches are controlled in accordance with an operation mode control signal;
   (c) a modulation unit for generating an optical data signal in accordance with a control signal that is formed from the generated differential phase shift keying coded data stream and from the generated amplitude shift keying coded data stream.

2. The device according to claim 1, wherein the modulation unit is a Mach-Zehnder modulator.

3. The device according to claim 1, wherein a multiplication unit forms the control signal for the modulation unit by multiplication of the differential phase shift keying coded data stream with the amplitude shift keying coded data stream.

4. The device according to claim 1, wherein a demultiplexer partitions a serial data stream having a high data transmission rate into a plurality of serial data streams having a reduced data transmission rate.

5. The device according to claim 4, wherein two of the serial data streams having a reduced data transmission rate are output by the demultiplexer to the differential phase shift keying unit).

6. The device according to claim 5, wherein the other serial data streams having a reduced data transmission rate are output by the demultiplexer to the amplitude shift keying unit.

7. The device according to claim 6, wherein the serial data streams having a reduced transmission rate that are output to the amplitude shift keying unit can be respectively selectively activated by the controllable switches.

8. The device according to claim 1, wherein the differential phase shift keying unit comprises:
   a multiplexer that switches alternatingly between two serial data streams and outputs a data stream at an output port of the multiplexer;
   an XOR gate arranged downstream from the multiplexer, the XOR gate having a first input port that is connected to the output port of the multiplexer and a second input port that is connected via a delay element to an output port of the XOR gate.

9. The device according to claim 1, wherein the differential phase shift keying unit comprises a first XOR gate receiving a serial data stream at a first input port and receiving at a second input port an output signal that is fed back from an output port of a second XOR gate via a delay element, and a multiplexer arranged downstream of the XOR gates that switches alternatingly between the output ports of the two XOR gates.

10. The device according to claim 9, wherein the delay time of the delay element is inversely proportional to the data rate of the serial data stream at the input ports of the XOR gate.

11. The device according to claim 1, wherein the amplitude shift keying unit comprises:
   (a) a storage for storing a coding table that can be read out, in which a bit combination of amplitude bits is stored for any bit combination of the serial data streams input into the amplitude shift keying unit;
   (b) a multiplexer for multiplexing the amplitude bits that are read out from the storage;
   (c) amplifiers with adjustable amplification factors for amplifying the multiplexed amplitude bits; and
   (d) an adder that adds amplified amplitude bits output by the amplifiers to generate the amplitude shift keying coded data stream.

12. The device according to claim 11, wherein amplification factors of the amplifiers in the amplitude shift keying unit are adjusted by a controller in accordance with a detected error rate that occurs when transmitting the optical data signal over the optical transmission channel to a receiver.

13. The device according to claim 12, wherein the detected error rate is transmitted from the receiver over a communication channel to the controller.

14. The device according to claim 4, wherein the serial data stream having a high data transmission rate has a data transmission rate of 100 Gbaud.

15. The device according to claim 4, wherein the serial data streams having a reduced data transmission rate each have a data transmission rate of 20 Gbaud.

16. The device according to claim 1, wherein the generated differential phase shift keying coded data stream and the generated amplitude shift keying coded data stream each have a data transmission rate of 40 Gbaud.

\* \* \* \* \*